(12) United States Patent
Wisser

(10) Patent No.: US 8,550,431 B2
(45) Date of Patent: Oct. 8, 2013

(54) SHAFT CONNECTION BETWEEN TWO SHAFTS

(76) Inventor: Joerg Wisser, St. Georgen (DE)

( * ) Notice: Subject to any disclaimer, the term of this patent is extended or adjusted under 35 U.S.C. 154(b) by 403 days.

(21) Appl. No.: 12/734,156

(22) PCT Filed: Oct. 15, 2008

(86) PCT No.: PCT/EP2008/008738
§ 371 (c)(1),
(2), (4) Date: Jun. 1, 2010

(87) PCT Pub. No.: WO2009/049882
PCT Pub. Date: Apr. 23, 2009

(65) Prior Publication Data
US 2010/0237268 A1    Sep. 23, 2010

(30) Foreign Application Priority Data
Oct. 15, 2007 (DE) .......................... 10 2007 049 579

(51) Int. Cl.
*F16K 5/00* (2006.01)

(52) U.S. Cl.
USPC ........... 251/292; 251/293; 251/304; 251/309; 251/315.01; 464/106

(58) Field of Classification Search
USPC ............... 251/304, 309–312, 315.01–315.16, 251/292, 293; 464/106
See application file for complete search history.

(56) References Cited

U.S. PATENT DOCUMENTS

| | | | |
|---|---|---|---|
| 949,189 A * | 2/1910 | Lentz | 464/106 |
| 1,128,432 A | 2/1915 | Fetzer | |
| 1,243,347 A * | 10/1917 | Schwinn | 464/106 |
| 1,625,511 A | 4/1927 | Ungerer | |
| 2,471,974 A | 5/1949 | O'Malley | |
| 3,512,375 A * | 5/1970 | Baio et al. | 464/106 |
| 4,188,801 A * | 2/1980 | Hugh et al. | 464/106 |
| 5,132,229 A * | 7/1992 | Ward, Jr. | 435/287.2 |
| 5,634,486 A | 6/1997 | Hatting et al. | |
| 6,517,439 B1 | 2/2003 | Sears | |
| 7,018,298 B1 * | 3/2006 | Chiou | 464/159 |
| 7,228,767 B2 * | 6/2007 | Chang | 464/106 |
| 2001/0032957 A1 | 10/2001 | Haines | |
| 2002/0145126 A1 | 10/2002 | Lian | |
| 2003/0066981 A1 | 4/2003 | Cross et al. | |

FOREIGN PATENT DOCUMENTS

| | | |
|---|---|---|
| DE | 1 932 926 | 2/1966 |
| DE | 43 30 819 A1 | 3/1995 |
| DE | 202 03 289 U1 | 9/2003 |
| DE | 10 2004 046 527 A1 | 3/2006 |
| GB | 1071044 | 6/1967 |
| JP | 2003 74685 | 3/2003 |
| JP | 2006 144920 | 6/2006 |
| WO | WO 2006/032225 A1 | 3/2006 |

* cited by examiner

*Primary Examiner* — John Bastianelli
(74) *Attorney, Agent, or Firm* — Muirhead and Saturnelli, LLC

(57) ABSTRACT

A shaft connection is provided between a first shaft and a second shaft, the first shaft having a longitudinal axis about which the first shaft can be rotated. The first shaft has a free end which engages into a coupling part which can be connected in a rotationally fixed manner to the second shaft. The free end of the first shaft is provided with an external profile which engages releasably into an internal profile of the coupling part. The external profile and/or the internal profile are/is configured in each case as a dihedron with two side surfaces which extend substantially parallel to one another. At least one side surface of the external profile and/or one side surface of the internal profile are/is configured in a convex manner in the longitudinal direction of the first shaft and/or the second shaft.

15 Claims, 2 Drawing Sheets

SHAFT CONNECTION BETWEEN TWO SHAFTS

TECHNICAL FIELD

This application relates to a shaft connection between two shafts.

BACKGROUND OF THE INVENTION

DE 43 30 819 A1 describes a connection between a rotary valve or a swivel valve and a rotary drive in which an outer end of a valve shaft engages in a coupling part of the output shaft of the rotary drive, which is why the outer end of the valve shaft is designed as a dihedron and engages in a corresponding recess in a form-fitting manner.

In order to allow a transmission of force from the rotary drive to the rotary valve or swivel valve to take place, a suitable form fit is necessary, but this requires an accurate alignment of the axis of the valve shaft and the axis of the shaft of the rotary drive. If the two shafts are tilted relative to one another, insertion of the free end of the valve shaft into the coupling part is impossible or results in severe wear in the valve because the inclination of the axes of the shafts relative to one another cannot be compensated. Furthermore, the valve may become leaky because of this wear.

Therefore, it would be desirable to provide a shaft connection between two shafts, in particular between a rotary valve or a swivel valve and a rotary drive, which will allow a slight inclination between the axes of the shafts, in particular the axes of the valve shaft of the rotary valve or swivel valve and the drive shaft of the rotary drive.

SUMMARY OF THE INVENTION

According to the system described herein, at least one side face of the exterior profile, designed as a dihedron, of the free end of a first shaft, which may be designed as a valve shaft, or at least one side face of the interior profile, designed as a dihedron, of the coupling part, which is connected in a rotationally fixed manner to the second shaft, the latter preferably being formed by the shaft of a rotary drive, is designed with a convex shape in the longitudinal direction of the first shaft and the second shaft. A surface curved in this way allows a tilting movement of the two shafts relative to one another, preferably a tilting movement of the valve shaft with respect to the coupling part, allowing compensation of unaligned axes of the two shafts or unaligned axes of the valve shaft and drive shaft of the rotary drive.

Both sides of the free end of the valve shaft or both side faces of the interior profile of the coupling part are preferably designed to be convex in the longitudinal direction, thus allowing compensation of greater offsets between the shafts.

The convex side faces are preferably designed as part of a cylindrical surface, the axis of the cylinder running perpendicular to the longitudinal axis of the valve shaft.

The convex side face preferably has in particular a radius of curvature which allows swiveling of the longitudinal axis of the first shaft, in particular the valve shaft, by approximately 1° to 3°, preferably by approximately 1.5° to 2°, in the coupling part. As a rule, greater inclinations of the axes relative to one another need not be compensated, so a comparatively slight curvature of the side faces is sufficient to achieve the desired result.

The valve plug according to the system described herein for a rotary valve or a swivel valve has a base body and a valve shaft situated on the base body, the valve plug being rotatable about a longitudinal axis running through the valve shaft in the rotary valve or swivel valve; the free end of the valve shaft facing away from the base body is designed as a dihedron having two essentially parallel side faces, at least one of the side faces, preferably both side faces, having a convex curvature in the longitudinal direction of the valve shaft. The convex side face is preferably designed here as part of a cylindrical surface, with the axis of the cylinder running perpendicular to the longitudinal axis of the valve shaft.

The valve plug is preferably designed in particular as a valve plug for a plug valve, in particular as a conical plug or a ball plug.

BRIEF DESCRIPTION OF THE DRAWINGS

Embodiments of the system described herein will now be explained in greater detail on the basis of the following figures.

FIG. 4b shows another axial section through the exemplary embodiment according to FIG. 4a, and FIG. 4c shows a top view of the coupling part according to FIG. 4a.

DETAILED DESCRIPTION OF VARIOUS EMBODIMENTS

Figure 1A:
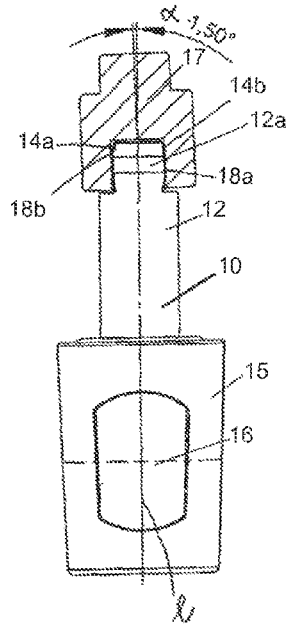
FIG. 1a shows an axial section through a first exemplary embodiment of the invention having a valve plug and a coupling part.
Figure 1B:
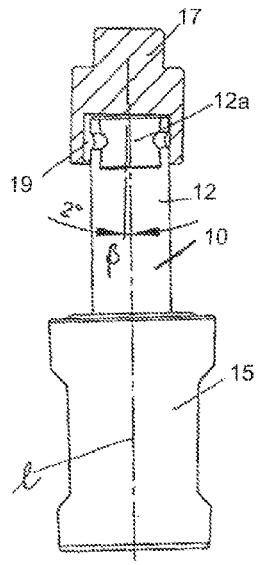
FIG. 1b shows another axial section through the exemplary embodiment according to FIG. 1a, FIG. 1c shows a top view of the valve plug according to FIG. 1a, FIG. 2a shows an axial section through a secondary exemplary embodiment of the invention having a valve plug and a coupling part.
Figure 1C:
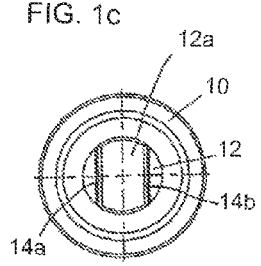

FIGS. 1a, 1b and 1c show a first exemplary embodiment of the invention having a valve plug 10 and a coupling part 17. Valve plug 10 has a base body 15 and a valve shaft 12 situated thereon, valve shaft 12 being designed essentially as a cylinder and defining a longitudinal axis 1 of valve plug 10. Base body 15 is designed as a cone and has a through-opening 16, so that valve plug 10 forms a conical plug.

Valve shaft 12 has a free end 12a, which is formed by the end of valve shaft 12 facing away from base body 15. Free end 12a has an exterior profile, which is designed as a dihedron having two side faces 14a, 14b. Each of two side faces 14a, 14b has a convex curvature, for example, in such a way that they form a portion of a cylindrical surface, the cylinder being situated in such a way that the axis of the cylinder runs perpendicular to longitudinal axis 1 of valve plug 10. Side faces 14a, 14b need not necessarily lie on the surface of a single cylinder. Side faces 14a, 14b are designed in such a way that for each cross section through free end 12a of valve shaft 12, the sectional lines run parallel to one another on side faces 14a, 14b. However, since side faces 14a, 14b are convex and since they are opposite one another on free end 12a, each is positioned on the outside, and thus they have opposite curvatures, so side faces 14a, 14b do not run exactly parallel to one another. The radius of curvature of side faces 14a, 14b is selected to be much larger than the distance of side faces 14a, 14b from longitudinal axis 1, resulting in a comparatively shallow curvature of side faces 14a, 14b.

Free end 12a of valve shaft 12 engages in a recess 19 in a coupling part 17. Recess 19 has an interior profile, which is designed as a dihedron having two opposite side faces 18a, 18b. Side faces 18a, 18b are designed as flat parallel faces. Side faces 14a, 14b of free end 12a of valve shaft 12 may be in contact with side faces 18a, 18b, but due to the curvature of side faces 14a, 14b of free end 12a, there is no flat contact between the two side face pairs 14a, 14b; 18a, 18b. Due to the curvature of side faces 14a, 14b of free end 12a, it is possible to tilt valve plug 10 by a small angle α in recess 19 of coupling part 17, as shown in FIG. 1a. Angle α may be approximately 1.5°, for example. FIG. 1b shows a sectional plane perpendicular to the sectional plane of the exemplary embodiment of the invention shown in FIG. 1a, illustrating that the width of recess 19 is larger than the width of free end 12a and also that a swivel movement of longitudinal axis 1 relative to coupling part 17 by an angle β amounting to, for example, approximately 2° is possible.

The connection between coupling part 17 and valve shaft 12 of valve plug 10 is a shaft connection by which it is possible to rotate valve plug 10 about its longitudinal axis 1 via a rotary drive (not shown) whose drive shaft is connected to coupling part 17 in a rotationally fixed manner. Valve plug 10 is situated in a plug valve (not shown) or some other rotary valve or swivel valve. Minor offsets between longitudinal axis 1 of valve plug 10 and the longitudinal axis of the drive shaft of the rotary drive may be compensated by the embodiment according to the invention of free end 12a of valve shaft 12 of valve plug 10.

Figure 2A:
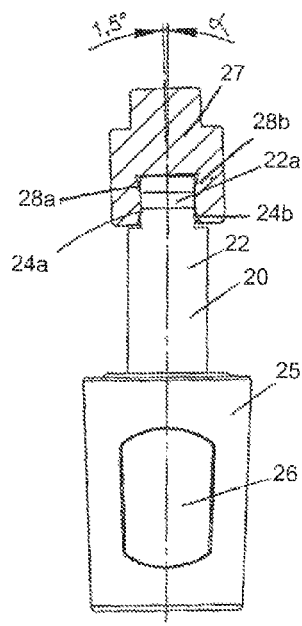
FIG. 2b shows another axial section through the exemplary embodiment according to FIG. 2a, FIG. 2c shows a top view of the coupling part according to FIG. 2a, FIG. 3a shows an axial section through a third exemplary embodiment of the invention having a valve plug and a coupling part.
Figure 2B:
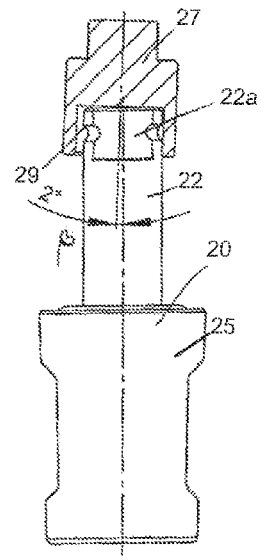
Figure 2C:
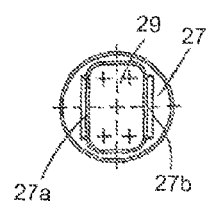

FIGS. 2a, 2b and 2c show a second exemplary embodiment of the invention having a valve plug 20 and a coupling part 27. Valve plug 20 has a base body 25 and a valve shaft 22 situated thereon, valve shaft 22 being designed essentially as a cylinder and defining longitudinal axis 1 of valve plug 20. Base body 25 is designed as a cone, so that valve plug 20 forms a ball plug and has a through-opening 26.

Valve shaft 22 has a free end 22a, which is formed by the end of valve shaft 22 facing away from base body 25. Free end 22a has an exterior profile, which is designed as a dihedron having two side faces 24a, 24b. Side faces 24a, 24b run parallel to one another and are designed as planar.

Free end 22a of valve shaft 22 engages in a recess 29 in coupling part 27. Recess 29 has an interior profile, which is designed as a dihedron having two opposite side faces 28a, 28b. Each of two side faces 28a, 28b has a convex curvature, for example, so that they form a part of a cylindrical surface, the cylinder being situated in such a way that the axis of the cylinder is perpendicular to the longitudinal axis of the drive shaft of the rotary drive, which runs parallel to longitudinal axis 1 of valve plug 20 in an accurately aligned system. Side faces 28a, 28b are designed in such a way that for each cross section through coupling part 27, the sectional lines on side faces 28a, 28b run parallel to one another. However, side faces 28a, 28b are curved, namely in opposite directions, because they form opposing side faces 28a, 28b of recess 29, so side faces 28a, 28b do not run exactly parallel to one another. The radius of curvature of side faces 28a, 28b is selected to be much larger than the distance of side faces 28a, 28b from longitudinal axis 1, resulting in a comparatively flat curvature of side faces 28a, 28b.

FIG. 2c shows a top view of recess 29 of coupling part 27, which shows that recess 29 is designed essentially as a cube and as a dihedron, the two longitudinal side faces 28a, 28b having a convex curvature.

Side faces 24a, 24b of free end 22a of valve shaft 22 may be in contact with side faces 28a, 28b, but because of the curvature of side faces 28a, 28b of coupling part 27, there is no flat contact between two side face pairs 24a, 24b; 28a, 28b. Due to the curvature of side faces 28a, 28b of coupling part 27, it is possible to tilt valve plug 20 by a small angle α in recess 29 of coupling part 27, as shown in FIG. 2a. Angle α may be approximately 1.5°, for example. In the sectional plane shown in FIG. 2b, which is perpendicular to the sectional plane of the exemplary embodiment of the invention, as shown in FIG. 2a, the width of recess 29 is greater than the width of free end 22a; furthermore, a swivel movement of longitudinal axis 1 with respect to coupling part 27 about an angle β, which is approximately 2°, for example, is possible.

The connection between coupling part 27 and valve shaft 22 of valve plug 10 forms a shaft connection, by which it is possible to rotate valve plug 20 about its longitudinal axis 1 via a rotary drive (not shown), whose drive shaft is connected to coupling part 27 in a rotationally fixed manner. Valve plug 20 is situated in a plug valve (not shown) or some other rotary valve or swivel valve. A minor offset between longitudinal axis 1 of valve plug 20 and the longitudinal axis of the drive shaft of the rotary drive may be compensated by the embodiment of coupling part 27 according to the invention.

Figure 3A:
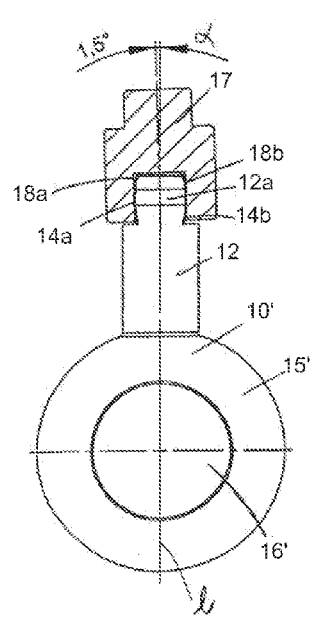
FIG. 3b shows another axial section of the exemplary embodiment according to FIG. 3a, FIG. 3c shows, a top view of the valve plug according to FIG. 3a, FIG. 4a shows an axial section through a fourth exemplary embodiment of the invention having a valve plug and a coupling part.
Figure 3B:
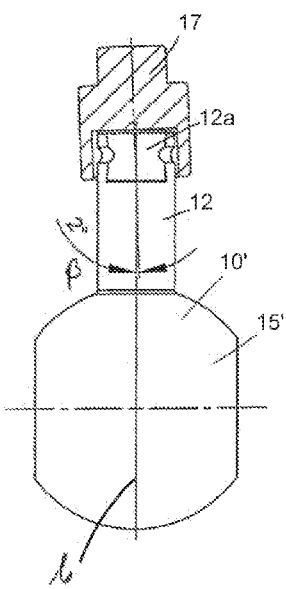
Figure 3C:
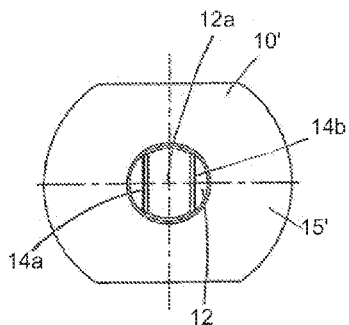

FIGS. 3a, 3b and 3c show a third exemplary embodiment of the invention, which corresponds largely to the exemplary embodiment according to FIGS. 1a, 1b and 1c, so that the same parts are labeled with the same reference numerals. The third exemplary embodiment has a valve plug 10', which differs from valve plug 10 according to the first exemplary embodiment only in the design of its base body 15', which is designed as a sphere in the present third exemplary embodiment, so that valve plug 10' is designed as a ball plug. Base body 15' has a through-opening 16', which may be designed as a cylindrical through-bore through base body 15', for example.

Figure 4A:
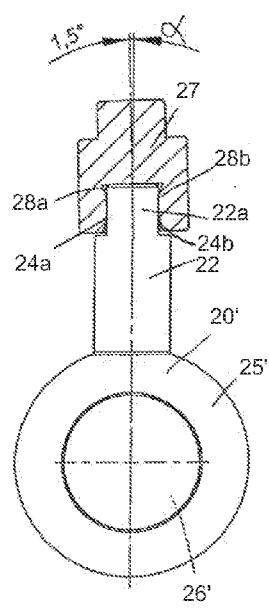
Figure 4B:
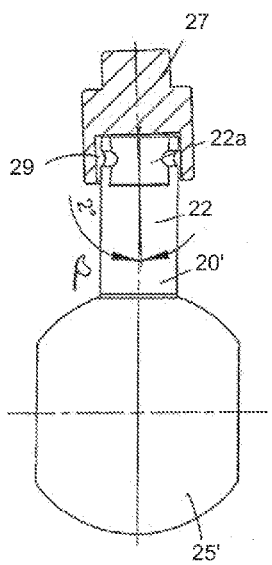
Figure 4C:
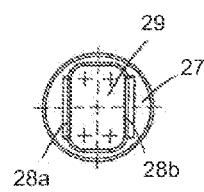

FIGS. 4a, 4b and 4c show a fourth exemplary embodiment of the invention, which is largely identical to the second exemplary embodiment illustrated in FIGS. 2a, 2b and 2c, so that the same parts are labeled with the same reference numerals. The fourth exemplary embodiment has a valve plug 20', which differs from valve plug 20 shown in FIGS. 2a through 2c only in the design of its base body 25'. Valve plug 20' has a base body 25' having a through-opening 26', which is designed to be spherical, so that again a ball plug is formed.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:
1. A method of connecting a first shaft and a second shaft, comprising:
providing an exterior profile of a free end of the first shaft, wherein the first shaft has a longitudinal axis about which the first shaft is rotatable;
providing a coupling part having a recess, the recess having an internal profile;

connecting the coupling part in a rotationally fixed manner to the second shaft; and releasably engaging the coupling part with the first shaft, wherein the external profile of the free end of the first shaft releasably engages the internal profile of the recess of the coupling part by insertion in an axial direction of the longitudinal axis of the first shaft, wherein the external profile of the free end of the first shaft includes two lateral faces on opposite sides of the free end, and wherein at least one lateral face of the internal profile of the recess of the coupling part is a convex lateral face made convex in the axial direction of the longitudinal axis of the first shaft, and wherein, after axial insertion of the free end of the first shaft into the recess of the coupling part, a width of the recess of the coupling part and a radius of curvature of the convex lateral face of the internal profile of the recess enable a pivoting movement of the longitudinal axis of the first shaft in the coupling part that is limited to an angle of less than 3°.

2. The method according to claim 1, wherein the internal profile of the recess of the coupling part includes two lateral faces that are made convex in the longitudinal direction.

3. The method according to claim 1, wherein at least one of the two lateral faces of the external profile is a part of a surface of a cylinder, and wherein an axis of the cylinder extends at a right angle to the longitudinal axis of the first shaft.

4. The method according to claim 1, wherein the radius of curvature enables pivoting of the longitudinal axis of the first shaft in the coupling part by approximately 1° to less than 3°.

5. The method according to claim 4, wherein the radius of curvature enables pivoting of the longitudinal axis of the first shaft in the coupling part by approximately 1.5° to 2°.

6. A shaft connection between a first shaft and a second shaft, wherein the first shaft is a shaft of a rotary or swivel valve and wherein the second shaft is a shaft of a rotary drive, the shaft connection comprising:

a coupling part which is connected in a rotationally fixed manner to the second shaft and having a recess which engages in a releasable manner with the first shaft, wherein the first shaft has a longitudinal axis about which the first shaft is rotatable and includes a free end which engages in the recess of the coupling part, wherein the free end of the first shaft is provided with an external profile which engages in an internal profile of the recess of the coupling part by insertion in an axial direction of the longitudinal axis of the first shaft, wherein the external profile of the free end includes two lateral faces on opposite sides of the free end that extend substantially parallel to each other, and wherein at least one lateral face of the internal profile of the recess of the coupling part is a convex lateral face made convex in the axial direction of the longitudinal axis of the first shaft, and wherein, after the axial direction insertion of the free end of the first shaft into the recess of the coupling part a width of the recess of the coupling part and a radius of curvature of the convex lateral face of the internal profile of the recess enable a pivoting movement of the longitudinal axis of the first shaft in the coupling part that is limited to an angle of less than 3°.

7. The shaft connection according to claim 6, wherein the internal profile of the recess of the coupling part includes two lateral faces that are made convex in the longitudinal direction.

8. The shaft connection according to claim 6, wherein at least one of the two lateral faces of the external profile is a part of a surface of a cylinder, and wherein an axis of the cylinder extends at a right angle to the longitudinal axis of the first shaft.

9. The shaft connection according to claim 6, wherein the radius of curvature enables pivoting of the longitudinal axis of the first shaft in the coupling part by approximately 1° to less than 3°.

10. The shaft connection according to claim 9, wherein the radius of curvature enables pivoting of the longitudinal axis of the first shaft in the coupling part by approximately 1.5° to 2°.

11. A shaft assembly, comprising:
a first shaft;
a second shaft; and
a coupling part which is connected in a rotationally fixed manner to the second shaft and having a recess which engages in a releasable manner with the first shaft, wherein the first shaft has a longitudinal axis about which the first shaft is rotatable and includes a free end which engages in the recess of the coupling part, wherein the free end of the first shaft is provided with an external profile which engages in an internal profile of the recess of the coupling part by insertion in an axial direction of the longitudinal axis of the first shaft, wherein the external profile of the free end includes two lateral faces on opposite sides of the free end, and wherein at least one lateral face of the internal profile of the recess of the coupling part is a convex lateral face made convex in the axial direction of the longitudinal axis of the first shaft, and wherein, after the axial direction insertion of the free end of the first shaft into the recess of the coupling part, a width of the recess of the coupling part and a radius of curvature of the convex lateral face of the internal profile of the recess enable a pivoting movement of the longitudinal axis of the first shaft in the coupling part that is limited to an angle of less than 3°.

12. The shaft assembly according to claim 11, wherein the internal profile of the recess of the coupling part includes two lateral faces that are made convex in the longitudinal direction.

13. The shaft assembly according to claim 11, wherein at least one of the two lateral faces of the external profile is a part of a surface of a cylinder, and wherein an axis of the cylinder extends at a right angle to the longitudinal axis of the first shaft.

14. The shaft assembly according to claim 11, wherein the radius of curvature enables pivoting of the longitudinal axis of the first shaft in the coupling part by approximately 1° to less than 3°.

15. The shaft assembly according to claim 14, wherein the radius of curvature enables pivoting of the longitudinal axis of the first shaft in the coupling part by approximately 1.5° to 2°.

* * * * *